ELECTRONIC SWITCHING NETWORK

Original Filed March 20, 1961 6 Sheets-Sheet 1

INVENTOR.
Max S. Macrander

BY C. A. Guttrandsen
Atty.

ELECTRONIC SWITCHING NETWORK

Original Filed March 20, 1961 6 Sheets-Sheet 2

INVENTOR.
Max S. Macrander

BY C. A. Gullbrandsen
Atty.

ELECTRONIC SWITCHING NETWORK

Original Filed March 20, 1961 6 Sheets-Sheet 3

INVENTOR.
Max S. Macrander

BY C. A. Gulbrandsen
Atty.

ELECTRONIC SWITCHING NETWORK

Original Filed March 20, 1961 6 Sheets-Sheet 4

INVENTOR.
Max S. Macrander
BY
C. A. Gulbransen
Atty.

ELECTRONIC SWITCHING NETWORK

Original Filed March 20, 1961 6 Sheets-Sheet 5

INVENTOR.
Max S. Macrander
BY
C. A. Gulbrandsen
Atty.

ELECTRONIC SWITCHING NETWORK

Original Filed March 20, 1961 6 Sheets-Sheet 6

INVENTOR.
Max S. Macrander
BY
C. A. Gulbrandsen
Atty.

United States Patent Office

Re. 26,498
Reissued Dec. 3, 1968

26,498

ELECTRONIC SWITCHING NETWORK

Max S. Macrander, Wheaton, Ill., assignor to Automatic Electric Laboratories, Inc., Northlake, Ill., a corporation of Delaware Original No. 3,184,552, dated May 18, 1965, Ser. No. 96,957, Mar. 20, 1961. Application for reissue Apr. 18, 1966, Ser. No. 546,127
20 Claims. (Cl. 179—18)

Matter enclosed in heavy brackets [ ] appears in the original patent but forms no part of this reissue specification; matter printed in italics indicates the additions made by reissue.

This invention relates to electronic switching networks and more particularly to circuits for controlling the establishment of a transmission path through such networks.

In telephone central office communication systems an arrangement for permitting the interconnection of particular central office subscribers is required. In one arrangement for accomplishing this purpose, a switching circuit interconnects each line or trunk in a first group of terminations with each line or trunk in a second group of terminations. The switching network includes a series of stages between the two groups of terminations, with each stage including a number of bistable breakdown devices as crosspoint switches. The breakdown devices are interconnected at circuit nodes to provide many alternative paths between the two groups of terminations. These nodes are referred to herein as links. In electronic switching systems, the crosspoint elements are employed for establishing the path between terminations as the crosspoint elements are switched from their high impedance to their low impedance states. Following the establishment of connections through the network, each series of energized crosspoint switches also constitutes a talking path through the network. In addition, cross-talk between different talking paths is practically eliminated by the blocking action of cross-points in their high impedance states. The crosspoint switching devices may for example be gas diodes, or four-layer semiconductor diodes.

In one arrangement of such diodes in a switching network, these diodes are interconnected in successive stages to provide transmission paths through the network between particular subscribers, as described. One way of controlling such a switching network is to use the end-marking technique, whereby the inherent characteristics of the crosspoint are utilized to establish a path through the network between a particular pair of terminals which have been "marked" by appropriate potentials.

One disadvantage of the arrangements previously used to carry out the end-marking technique, particularly for systems serving a large number of subscribers and having a correspondingly large number of stages, aries from the fact that, as breakdown of the crosspoints proceeds from stage to stage in the establishment of a path through the network, a progressively larger number of crosspoints becomes conducting in each stage. These conducting crosspoints remain in the low-impedance, high-current stage until the desired connection is completed, when all but the crosspoints comprising this connection are returned to the high-impedance, low-current condition. This "fan-out," as it is called, of conducting crosspoints from a terminal toward the interior of the network imposes rather high current requirements on the marking voltage source and the crosspoints near the network terminals, since each end crosspoint must carry the current for many other conducting crosspoints in parallel. As the total fan-out current is many times the normal sustain current of a single crosspoint and since it flows only during the fraction of a second that a network path is being established, it becomes manifest that providing crosspoints capable of handling such large currents necessarily involves inefficient use of component capabilities.

Arrangements have been devised to avoid fan out and still enjoy most of its benefits with respect to reduction of connection build-up time, by marking groups of links in fan like patterns initiating from the terminals. However in such an arrangement one has to sacrifice in the marking simplicity since in addition to the terminals it is necessary to mark groups of links in fan like patterns. In addition it is necessary to prevent the marking of busy links that may be present in the groups to be marked. This requires the use of bistable elements in the link marking circuitry.

Another possible arrangement for selecting and establishing a connection is to provide a path finder arrangement in the common control equipment to preselect the path to be used. For large networks the path finder portion of the common control equipment becomes a quite extensive device.

The object of the invention is to provide a simple and effective arrangement for selecting and establishing a path through a crosspoint network, in which no one crosspoint device will be required to sustain a large current flow during the selecting process, but which still permits the end marking technique to be used. In large multistage networks one junctor link in the center of the network may also be marked by the common control equipment.

According to the invention, a progressive technique is used to determine which of the links accessible through crosspoints fanning out from a selected marked terminal are idle, in which the crosspoints are fired from stage to stage along a possible path until it is blocked, and then reverts back to a preceding node and tests another possible branch, continuing in this manner to test as many of the possible branches as is necessary. The internal nodes or links have passive link markers comprising a capacitor shunted by a resistor connected to a source of bias potential. Each time the progressive testing proceeds through crosspoint devices to a link the capacitor of that link marker charges up to the potential of the marked terminal from which a path is being tested.

The progressive technique according to the invention may be used either for progressive marking or for progressive path finding. With progressive marking the procedure is initiated with only one end terminal marked. All possible idle paths are then tested up to a certain point and the capacitors of the link markers of idle links are charged to retain the marking thereon for a time determined by the discharge time constant of the link marker.

With the progressive path finding technique, two end links are marked at opposite ends of a plurality of network stages. The terminal to be found is marked first, and then the terminal at the opposite end of the network is marked to initiate the progressive testing. When the testing has proceeded through the several stages along a path which reaches the marked terminal, the connection is then established.

According to a further feature of the invention, junctors may be used in the center of the network, and the progressive techniques used between the two end terminals respectively and the junctors. The network may be arranged to initiate the progressive testing either from the end terminals or from the junctors.

The above-mentioned and other objects and features of this invention and the manner of obtaining them will become more apparent, and the invention itself will be best understood, by reference to the following description of embodiments of the invention taken in conjunction with the accompanying drawings comprising FIGS. 1 to 8 wherein.

The invention may be embodied in various multistage crosspoint switching networks which are well known in the art. In such a network each switching stage comprises a plurality of switching matrices. Each matrix has a number of input links and a number of output links, and each input link is connected to each output link through an individual crosspoint switching device. The crosspoint switching devices may be chosen from any suitable bistable devices such as gas tubes, or various semiconductor devices. To be suitable for use in the switching network the device should have one stable state with very high impedance corresponding to the off condition, and one stable state with very low impedance corresponding to the transmission condition. One device frequently used in such networks is a four layer, two terminal, semiconductor device disclosed in Shockley Patent No. 2,855,524. An Electronic Switching System utilizing the Shockley device is disclosed in the U.S. patent application Serial No. 845,901, filed October 12, 1959, by John G. Van Bosse, now Patent No. 3,133,154. An Electronic Telephone Switching System using switching networks with gas tube devices is disclosed in the Budlong et al. U.S. Patent 2,955,165, and in the description starting in column 41 of that patent, reference is made to several patents and applications disclosing suitable switching networks.

Figure 1:
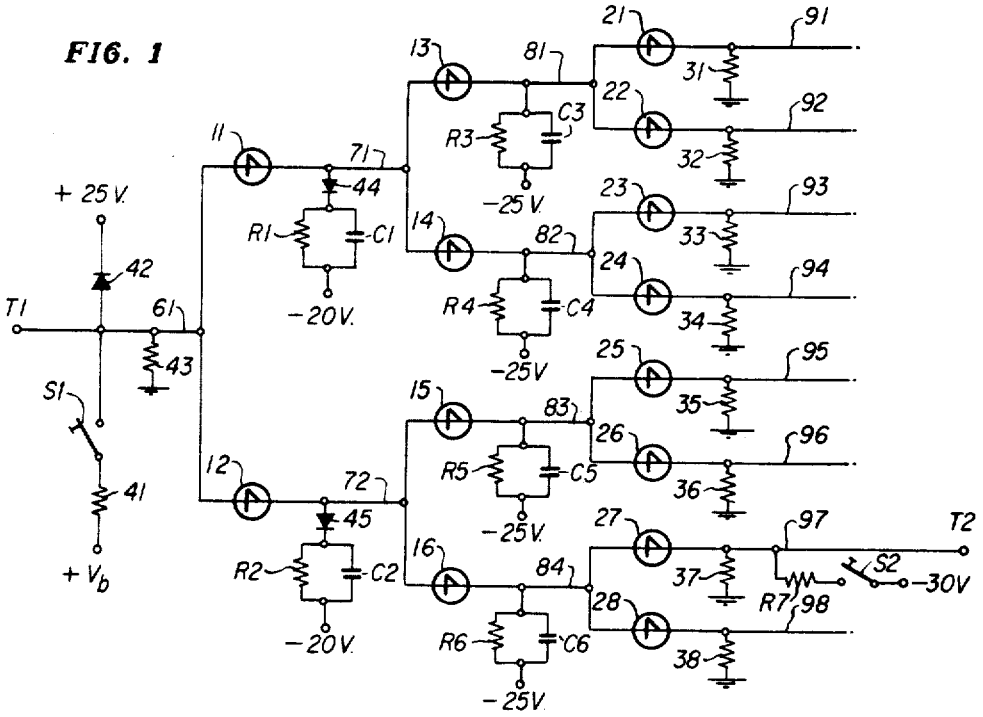
FIG. 1 is a schematic diagram of a portion of a crosspoint switching network, illustrating the principle of the invention.

FIG. 1 is a schematic diagram of a portion of a crosspoint switching network, illustrating the principle of the invention. The crosspoint devices 11–16 and 21–28 are assumed to be Shockley four-layer diodes having a rated breakdown voltage to switch from the high impedance state to the low impedance state at 40 volts. This value has been found to be sensitive to the rate at which the breakdown voltage is applied. For optimum performance in a network using the techniques according to the invention, it is desired that this rate effect variation be minimized. However there should be some slight variations in the breakdown voltage at the rate used, so that when the voltage is applied across a plurality of crosspoints simultaneously only one crosspoint will break down and thereby prevent the others from firing. The crosspoint devices will be referred to hereinafter simply as "crosspoints."

FIG. 1 shows three stages of a network, and in each stage shows only those crosspoints which may be incorporated in possible paths extending from a terminal T1. Also to simplify the explanation, each input link of a stage is shown as having access to only two output links.

Each of the intermediate links has a passive marking arrangement comprising a capacitor shunted by a resistor and connected between a source of bias potential and the link. Each of the end links is connected through a resistor to ground. The input link from terminal T1 is clamped through a diode 42 to a maximum +25 volts. This link may be selectively marked by closing switch S1 to connect it through resistor 41 to a voltage source +Vb.

A progressive marking technique according to the invention will first be explained with reference to FIG. 1. Assume that all of the links 91-98 to the right of the crosspoints 21–28 are connected only to ground potential through their respective resistors 31–38, and that the idle links 81–84 to the left of these crosspoints 21–28 accessible from the terminal T1 are to be marked. The marking procedure is started by closing switch S1. As the voltage on link 61 rises, either crosspoint 11 are crosspoint 12 will fire, depending upon which has the lowest breakdown voltage. Assume that crosspoint 11 fires, and that therefore capacitor C1 starts to charge in the path from +Vb through the crosspoint 11 and diode 44 to the −20 volt source. After capacitor C1 has charged to a sufficiently high potential, either crosspoint 13 or 14 has to fire, and not crosspoint 12. This is because of the increased negative bias level equal to −25 volts on crosspoints 13 and 14. If crosspoint 13 is the one which fires, the capacitor C3 will be charged up until crosspoint 14 fires. At the same time that crosspoint 14 fires, crosspoint 13 will drop out because of the inverse voltage applied across it, approximately +20 volts at its cathode on link 81, and −20 volts at its anode applied from link 82 through crosspoint 14. Now capacitor C4 charges until crosspoint 12 fires. Crosspoints 11 and 14 now drop out because of the inverted voltage applied across them. Crosspoints 15 and 16 will now be fired in succession, in an order depending upon the respective breakdown voltages, in a manner similar to the previous firing of crosspoints 13 and 14. If now the RC time constant for the condenserd discharge path is large so that sufficient positive voltage is present on the capacitor C1 to prevent refiring of crosspoint 11, then the capacitor in the link following the last fired crosspoint reaches the +25 voltage level, the crosspoints 12 and 15 or 16 will drop out if the current through the shunt resistor is smaller than the holding current. This is insured by using a large enough value for the shunt resistor to the link marker. At this time all of the crosspoints are in the off state, all of the link condensers are discharging via the shunt resistors. The links 81–84 are now marked and a path may be established to any one of the links 91–98 by applying a negative voltage of sufficient value thereto, before the capacitors in the link markers have discharged too much.

A progressive path finding technique will now be described with reference to FIG. 1. This technique permits the network to be end marked at terminals such as T1 and T2, and an idle path to be found and established between these terminals. The switch S2 is first closed to apply −30 volts through resistor R7 to the link 97 to thereby mark the terminal T2. Then switch S1 is closed to place the +Vb potential through resistor R41 to the link 61 to mark the terminal T1. The possible crosspoint paths fanning out from link 61 are then progressively tested in the same manner as described above for the progressive marking technique. When during this progressive testing the crosspoints 12 and 16 are in the conducting state and capacitor C6 has charged sufficiently, the crosspoint 27 will be the next one to fire because of the −30 volt marking potential on its cathode. The resistors 41 and R7 are chosen with a value such that the established connection between terminals T1 and T2 assumes a voltage level of such a value that the step by step path finding procedure must stop. The voltages on the idle links that have become marked during the testing procedure will return to their values after some time as the capacitors in their marking circuits discharge.

Figure 2:
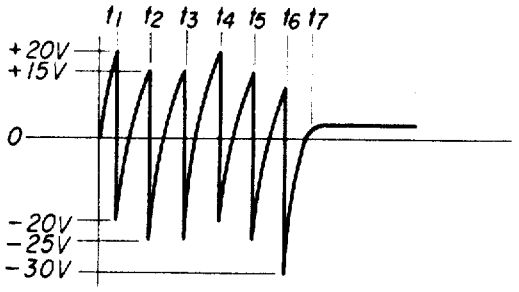
FIGS. 2 and 3 are graphs showing the voltage appearing at the marked terminal and at one of the first interstage nodes respectively during progressive path finding.
Figure 3:
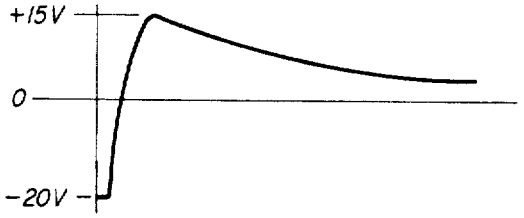

FIG. 2 is a graph showing the voltage at terminal T1 during progressive path finding with terminal T2 marked. Initially the switch S1 is closed, and at time t1 the potential across the crosspoint 11 reaches its breakdown value of approximately 40 volts and fires. The −20 volt marking on link 71 is then applied through crosspoint 11 to link 61. The capacitor C1 charges until the voltage reaches approximately 15 volts at time t2 and crosspoint 13 fires. The −25 volt potential is then applied through crosspoints 13 and 11 to link 61. The capacitor C3 then charges until the voltage rises again to approximately 15 volts at which time t3 the crosspoint 14 fires and causes the −25 volt potential from link 82 to appear through crosspoints 14 and 11 at link 61. Crosspoint 13 now drops out. Capacitor C4 charges until the potential at link 61 reaches approximately 20 volts, at which time t4 the crosspoint 12 fires, and causes the crosspoints 11 and 14 to drop out. The −20 volt potential from link 72 is then applied to link 61. Capacitor C2 charges until at time t5 the crosspoint 16 fires and applies the −25 volt potential from link 84 to link 61. Capacitor C6 then charges until the potential reaches again approximately +10 volts at time t6 and crosspoint 27 fires. The voltage then rises until at time t7 it reaches a steady state value which is slightly positive. FIG. 3 is a graph of the voltage appearing on link 71.

It should be noted that the maximum voltage which can be applied across any crosspoint to fire it is equal to the sum of the rated breakdown voltage which can be designated Vs and a voltage step which can be designated Vd. In FIG. 1, the bias potentials shown have been chosen on the basis of a value of Vs equal to 40 volts, and a value of Vd equal to 5 volts. The voltage step Vd is used to insure that during testing all of the crosspoints of a stage will be tested. The arrangement is such that the bias potential applied to the markers of each stage differs from the bias potential of the preceding stage by the Vd. This insures that every idle crosspoint link is tested, progressing from stage to stage, and back if not successful. Busy links are at substantially ground potential. Crosspoints having 0 volt on their output terminals will not fire because only one half of the breakdown voltage is applied to the device. Referring specifically to the bias potentials shown in FIG. 1, the clamping potential on link 61 applied through diode 42 is equal to one half Vs plus Vd. The bias potential applied to each of the links 71 and 72 is equal to minus one half Vs. The bias potential applied to each of the links 81–84 inclusive is equal to minus one half Vs minus Vd. In the links following the next stage, the potential applied to mark a link, for example to mark link 97 by closing switch S2, is equal to minus one half Vs minus 2Vd.

The important feature of the progressive technique according to the invention is that never more than one branch of the network has to be supplied with sustaining current. Furthermore, the internal link marking circuitry is simple. The capacitor and shunt resistor of each link marker can be chosen such that the impedance for audio, or even higher frequencies, is such that the loss is negligible. This is especially true if the crosspoint devices have negligible rate effect sensitivity. If this is the case, then the time required to charge the crosspoints of each link marker can be limited to values of less than one microsecond. With selected Shockley four-layer diodes, times of 5 microseconds per capacitor have been reached, allowing the testing of 200 crosspoints per millisecond.

Figure 4:
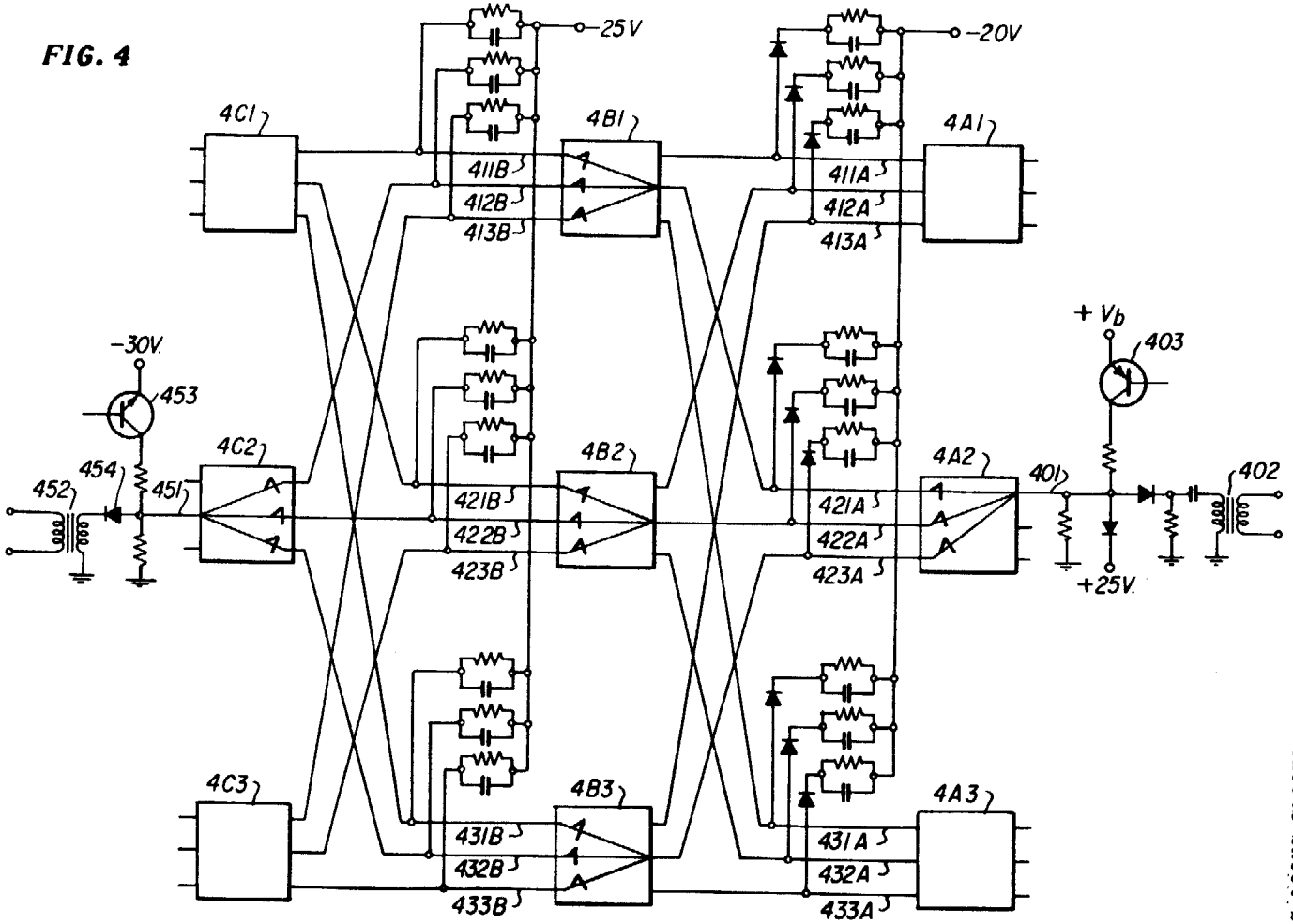
FIG. 4 is a block and schematic diagram showing a typical network using progressive path finding.

FIG. 4 is a block and schematic diagram showing a typical network using progressive path finding. The drawing shows a simplified three stage network. Each stage is shown as having three crosspoint matrices, with each matrix having a total of 9 crosspoints in a 3 x 3 arrangement between 3 input links and 3 output links. In each matrix, only those crosspoints are shown which can be used as part of a path between link 401 on the right and link 451 on the left of the network. The network includes stage A comprising matrices 4A1, 4A2 and 4A3; stage B comprising matrices 4B1, 4B2 and 4B3; and stage C comprising matrices 4C1, 4C2 and 4C3. Each of the links 411A–433A extending between stage A and stage B has a passive link marker comprising a capacitor shunted by a resistor connected to a bias source of −20 volts. Each of the links 411B–433B extending between stage B and stage C has a similar passive link marker connected to a bias source of −25 volts. The links to the right of stage A are selectively marked by closing switch 403 to a potential +Vb substantially greater than 25 volts and are clamped to a maximum of +25 volts. The links to the left of stage C are selectively marked by closing switch 453 by a bias source of −30 volts. If a connection is to be established between the terminal coupled to link 401 and the terminal coupled to link 451, the link 451 is marked first by closing the transistor switch 453. Then the link 401 is marked by closing the transistor switch 403, and the progressive testing is initiated from link 401 to find a path to link 451. After a path is found and established, the switch 453 is opened and the switch 403 remains closed to hold the connection. Sustaining current then flows from +Vb through switch 403, and thence from link 401 through a crosspoint of each stage to link 451, thence through diode 454 and a winding of transformer 452 to ground. Upon disconnect, switch 403 is opened to thereby cut off the sustaining current and release the connection.

Figure 5:
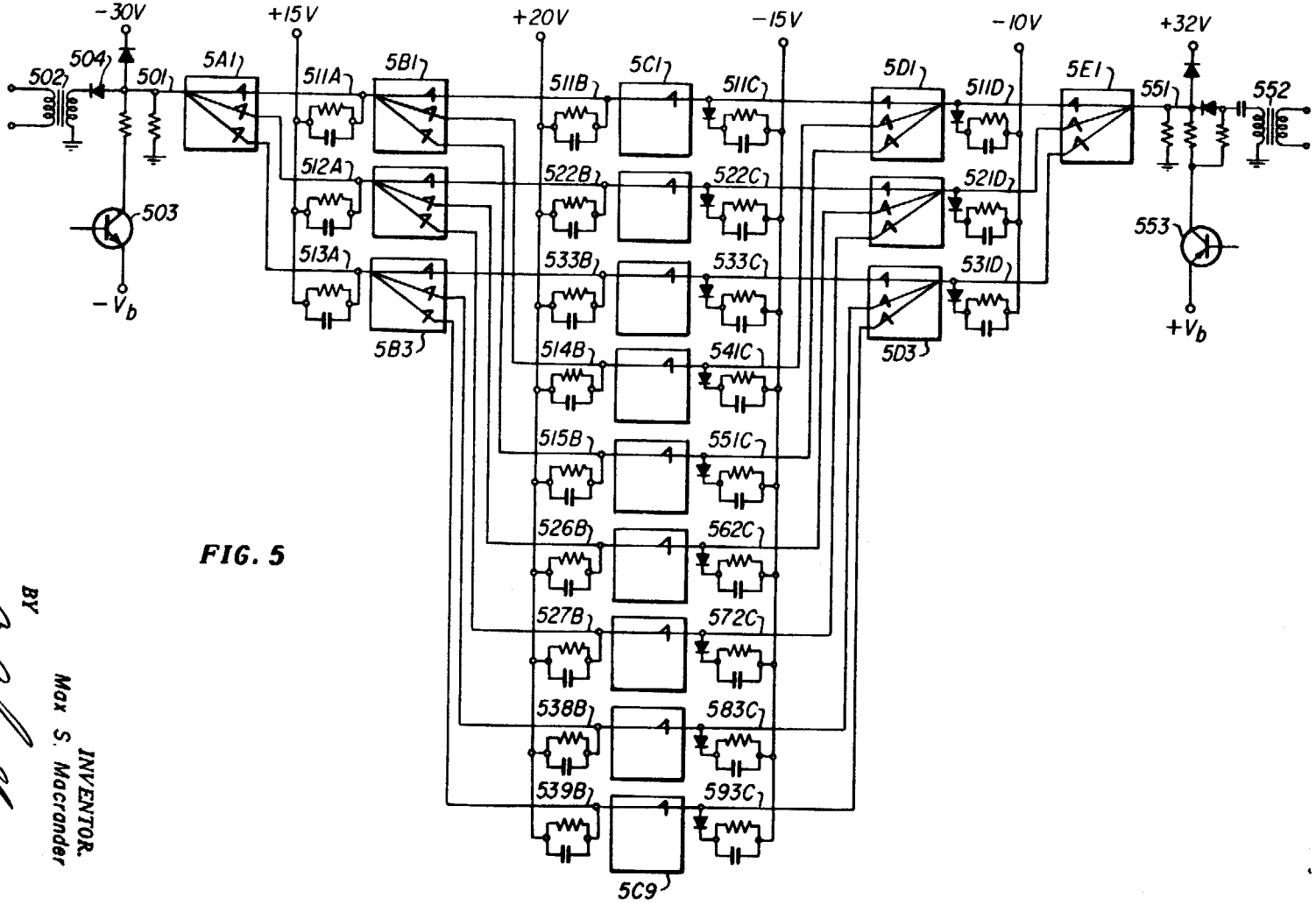
FIG. 5 is a schematic and block diagram of a portion of a crosspoint network illustrating a technique using a combination of progressive path finding and progressive marking.

FIG. 5 is a schematic and block diagram of a portion of a crosspoint network illustrating a technique using a combination of progressive path finding and progressive marking which substantially reduces the time required to find and establish a connection in an extensive network. As was explained with reference to FIG. 1, if the progressive technique is only initiated at one terminal, and no terminal is marked at the other side of the network, then the crosspoints will fire and drop out successively. This is the case in FIG. 1 if switch S1 is closed, but switch S2 remains open. After the last crosspoint has been fired and dropped out, all of the idle internal links that fan out from the initially marked terminal are now group-marked with a marking voltage of opposite polarity, the decay time of which is determined by the RC discharge time constant of the link markers in these links. The crosspoint network may be so arranged that the progressive marking progresses toward the center stage of the network. The RC discharge time constant of the link markers should be chosen so that the marking voltage will decay at a comparatively slow rate with respect to the charge time. The marking voltage may then be considered to be preserved for some time. Then, subsequently a progressive path finding procedure may be started from the other side of the network. The first branch that reaches a crosspoint in the center that has an appropriate marking voltage applied to its other side, because of the previous progressive marking cycle will fire this crosspoint, and a connection will be established. Since there arrives only one branch at a time, multiple connections will be prevented. FIG. 5 shows a five stage network using this combined technique. Only those matrices of the network which can take part in a connection between a left hand terminal coupled to link 501, and a right hand terminal coupled to link 551 are shown. Thus in stage A one matrix 5A1 is shown, in stage B three matrices 5B1 to 5B3 are shown, in the center stage C nine matrices 5C1 to 5C9 are shown, in stage D three matrices 5D1 to 5D3 are shown, and in stage E one matrix 5E1 is shown. The links to the left of stage A are clamped to −30 volts when marked, and may be selectively marked through switches such as transistor switch 503 to a source of bias voltage −Vb. The links 511A–513A extending from stage A to stage B have passive link markers comprising a capacitor shunted by a resistor connected to a bias source +15 volts. The links 511B–539B extending between stage B and stage C have passive link markers connected to a bias source +20 volts. The links 511C–593C extending between stage C and stage D have passive link markers comprising a capacitor shunted by a resistor connected to a bias source −15 volts. The links 511D–531D extending between stage D and stage E have passive link markers comprising a capacitor shunted by a resistor connected to a bias source −10 volts. The links to the right of stage E are clamped to a bias source +32 volts when marked, and may be selectively marked through switches such as transistor switch 553 to a source of +Vb.

If a connection is to be found and established between the terminal coupled to link 501, and the terminal coupled to link 551, link 501 is first marked by closing the transistor switch 503. Progressive marking then proceeds as far as the center stage C. All of the idle links extending from link 501 through matrix 5A1 extending to the stage B will be marked with a potential of −25 volts. All of the idle links between stage B and stage C which are accessible from the marked links between stage A and stage B will also be marked with −25 volts.

After the progessive marking procedure from link 501 is completed, the terminal link 551 is marked by closing transistor switch 553. The crosspoints of matrix 5E1 are tested to find an idle one of the links 511D to 531D, and from there to find idle ones of the links 511C to 593C progressively as described with reference to FIG. 1. Each time an idle one of the links 511C to 593C is reached by the firing of a crosspoint in stage D, that link is marked with a positive voltage. The previously marked one of the links 511B to 539B will be marked with −25 volts approximately. Therefore the crosspoint in the C stage will be fired and, in response thereto the crosspoints in stage B and stage A will be fired in succession in the path leading to link 501. Sustaining current will then flow from the +Vb source through switch 553 and through the five crosspoints to link 501 and thence through switch 503 to −Vb. The resistors in series with the two transistor switches should be of values such that the potential on link 501 is slightly positive. Then current will flow through diode 504 and a winding of transformer 502 to ground. The switch 503 may then be opened and the connection will be maintained. To disconnect the switch 553 is opened to cut off the sustaining current and thereby release the connection. Note that in establishing the connection the proceeding from the center stage C toward the marked link 501 defines only one unique route because of the network structure.

The progessive technique may be applied to a crosspoint switching network in which the links in the center of the network are split and a unit called a junctor or bisector inserted in each. Switching networks of this type are shown in the said Budlong et al. patent, and in the said Van Bosse patent application. Such a network is also shown in the U.S. Patent 2,883,470 to Jacoby et al. for a Communication Switching Network. This patent shows a stepping device, there designated an enabling scanner, to test the junctors in turn. A junctor which may be used in the desired connection will have its two terminals marked by a fan out arrangement through the crosspoints from the marked terminals. When the scanner steps to a junctor which is marked on both sides it is selected and the connection is established.

Figure 6:
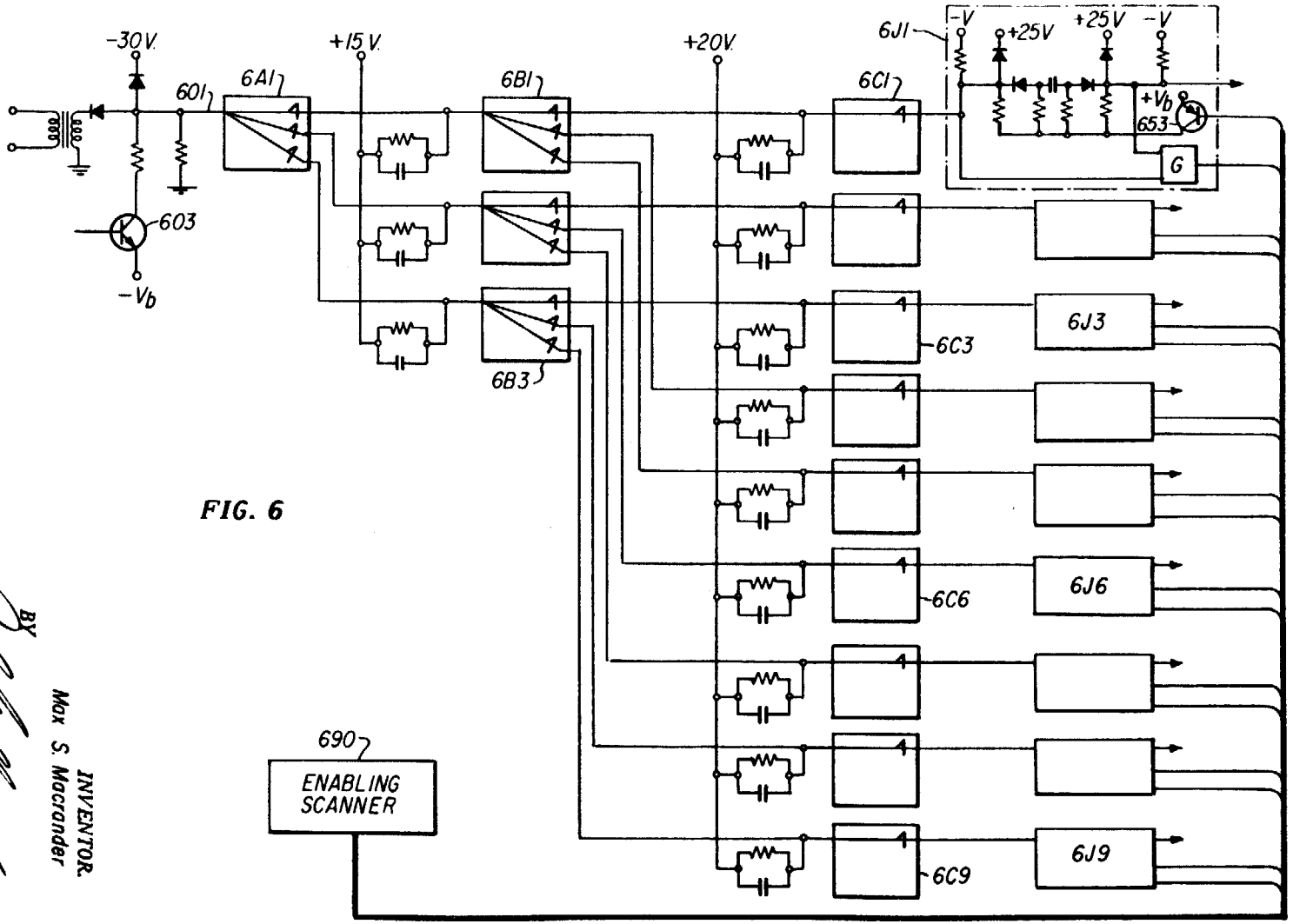
FIGS. 6, 7 and 8 are schematic and block diagrams showing portions of networks using center junctors with the progressive technique.
Figure 7:
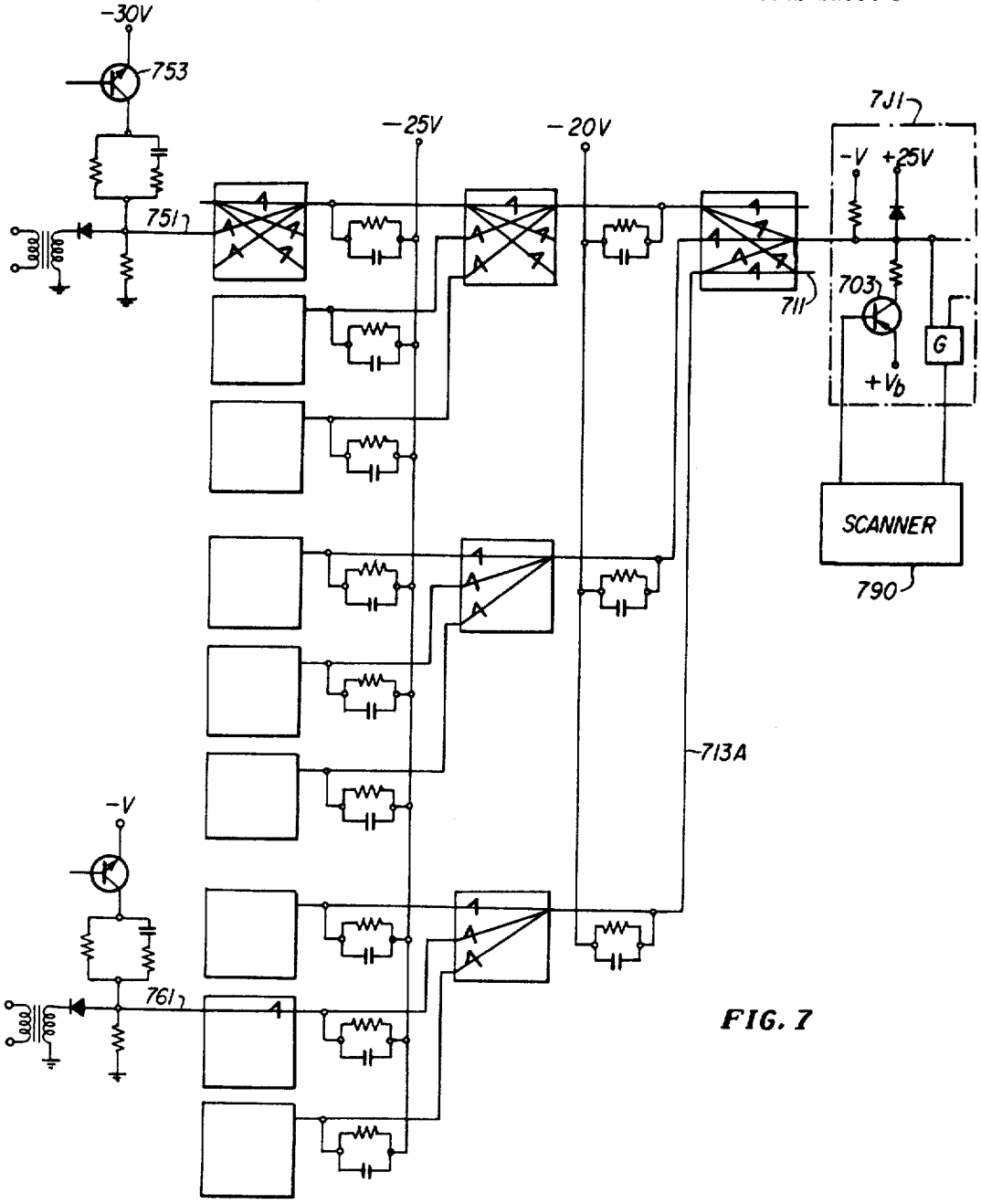
Figure 8:
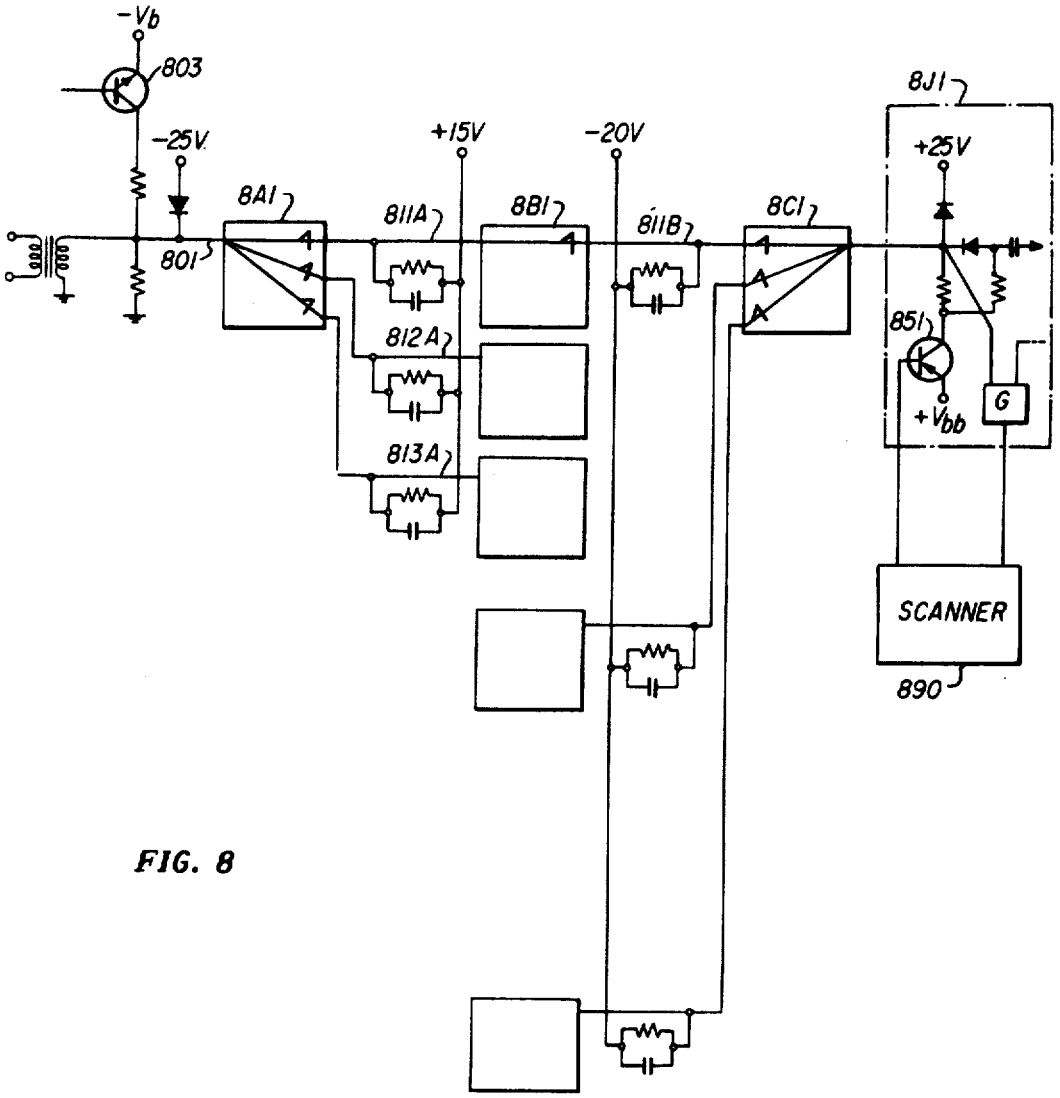

With the progressive technique used in this type of network there are three possibilities: (a) apply progressive marking to create a fan of marked links initiating at the two terminals and ending at the junctor, and then test the junctors by a stepping device and select a junctor that permits a connection; (b) mark the end terminals, then test the junctors by a stepping device such that every junctor starts a step by step progressive path finding procedure toward the terminals, and a junctor that is successful in finding the marked terminal on both sides is selected; (c) apply the progressive marking technique to create a fan of marked links initiating at the terminals and ending at some stage in the network, as in FIG. 5, and then test the junctors by a stepping device, letting the tested free junctors initiate a progressive path finding procedure into the network on each side to find a marked link, selecting the junctor that is successful on both sides. Examples of these three arrangements are shown in FIGS. 6, 7, and 8, respectively. In each of these figures, only one half of the network is shown, since it is symmetrical on both sides of the junctors. Also in the one half of the network shown, only that part of each stage is shown which can enter into a connection to the one terminal which is shown.

FIG. 6 shows a portion of a six stage network. The drawing shows the center junctors 6J1 to 6J9, and portions of stages A, B and C. One of the junctors 6J1 is shown with the details which enter into the progressive path finding procedure.

To establish a connection the link 601 is marked by closing switch 603, and another link on the opposite side of the network (not shown) is correspondingly marked. The idle links will then be marked progressively from the end links toward the junctors. Then the idle links between stages A and B and the idle links between stages B and C which are idle and can take part in the connection are marked with negative potential. The junctors are then tested one at a time by the enabling scanner. The junctor which is enabled has its transistor switch 653 closed to apply marking potential on the junctor link on each half of the network. A junctor that receives ground potentials on both sides after switching on its transistor switch 653 will by way of a gate G transmit a signal to the scanner 690. This causes the scanning to stop and that junctor to be selected. The connection is therefore established. The transistor switch 603 at link 601, and the corresponding switch on the opposite end of the network are then turned off. To disconnect, the switch 653 in the junctor is turned off, cutting off the sustaining current and causing the connection to be released.

FIG. 7 shows a portion of a six stage crosspoint switching network with center junctors similar to that shown in FIG. 6. However here the progressive path finding is started from the junctor toward both terminals. For example if the connection is to be established between link 751 and a corresponding link at the other side of the network (not shown), the switch 753 and the corresponding switch (not shown) at the other side of the network are closed to thereby mark the two terminals. Then the scanner 790 enables the junctors in turn. When the junctor 7J1 is enabled the transistor switch 703 is closed. Progressive path finding then initiates through the network on both sides. Assume that a conversation is in progress between the line terminal of link 761 and the junctor link 711 to another line terminal at the other side of the network. Then this path, including link 713A, is at substantially ground potential. Then the progressive testing proceeding from junctor 7J1 will not cause the firing of the crosspoint between the link of junctor 7J1 and link 713A. When the two marked terminals are found as indicated by ground at the junctor on both sides, a signal is transmitted by gate G to the scanner 790 to cause that junctor to be selected and the connection to be established. To disconnect, the transistor switch 703 is switched off.

FIG. 8 shows a portion of a six stage network with center junctors similar to those of FIGS. 6 and 7. Here the technique of FIG. 5 is used in each half of the network. The link 801 is marked by closing switch 803, and the corresponding link on the other side of the network (not shown) is similarly marked. This causes a progressive marking to proceed through stages A and to mark with negative potential the idle ones of the links 811A, 812A, and 813A. When the scanner 890 steps to the junctor 8J1, the switch 851 is switched on and progressive path finding proceeds through both halves of the network until one of the links between stages B and C which extends through stage B to a marked one of the links between stages A and B is tested. A connection is then established to the terminal link 801. If a connection is found available on both sides of the network to the marked links, ground potential from each side to gate G causes a signal to be sent to the scanner 890 to in turn cause that junctor to be selected and the connection to be established. Switch 803 is turned off and the connection is maintained. To disconnect, transistor 851 is switched off.

There is another possible arrangement of a network with junctors using the progressive technique. A plurality of free junctors may be marked with a marking pulse or step such that every junctor initiates a progressive marking procedure according to the arrangement of FIG. 5. As a result all idle links up to a certain point such as the links beyond the first stage on each side of the junctor are marked by having their capacitors charged. If now a progressive path finding procedure is started at a marked terminal from each side of the newtork, a path to a free junctor may be found on each side of the network. The junctors in this particular embodiment must be split into two symmetrical halves. The two half junctors that receive ground from the respective terminals must then be interconnected to complete the connection. This greatly reduces the time required to find an idle path and establish a connection. Other variations will lead to even faster solutions for reducing the total time required to establish a connection from terminal to terminal.

Since the breakdown voltage of the four-layer diodes or other bistable devices which may be used depend upon the rate at which the voltage is applied, it is to be understood in the claims that the breakdown voltage refers to the dynamic breakdown values.

Since four layer diodes have some interior capacitance, it is possible that they may be switched from the high impedance to the low impedance state without applying a breakdown voltage exceeding the static value. That is if the time derivative of the applied voltage exceeds the holding current of the device divided by its capacitance measured in the off state, the current may exceed the holding value and therefore switch the diode into a low impedance state. The invention may be applied to an arrangement in which this effect is used to switch the diodes.

There are also possible embodiments of the invention in which devices having three or more terminals may be used in the network. For example four-layer diodes may have an additional electrode connected to one of the inner layers with an appropriate circuit connection thereto to improve the switching characteristics. Also gas tubes may have a control electrode between the cathode and the anode. Arrangements using such devices are within the scope of the invention.

While I have described above the principles of my invention in connection with specific apparatus, it is to be clearly understood that this description is made only by way of example and not as a limitation to the scope of my invention.

What is claimed is:

1. A communication switching network comprising a plurality of bistable breakdown devices series-connected by links in stages to provide a plurality of transmission paths, each device having at least a first-polarity and a second-polarity electrode, with (a) a branching set of said devices having first-polarity electrodes connected in common to one link of a first group and second-polarity electrodes connected to separate links of a second group;

(b) a resistance-capacitance passive link marker individually connecting each second-group link to a bias source, which normally biases the links to the potential of the source;

(c) means connecting an end-marking potential source via a circuit including resistance to said one first-group link to cause one device of said set to break down to its low impedance state, thereby bringing said one first-group link to substantially the potential of the second-group bias source, which prevents break down of other devices of said set; said means being then effective to cause the capacitance of the second-group link marker to charge from said end-marking source to change the potential of the links at both sides of said one device;

(d) said means being effective to cause the charging of the second-group link marker to continue, upon the non-completion of a connection from the second-group link, until the potential at said one first-group link causes another device of said set to break down, thereby again bringing the first-group link to substantially the potnetial of the second-group bias source, which reverse biases said one device and thereby restores it to the high-impedance state, and also prevents break down of other devices of said set.

2. A communication switching network according to claim 1, with a second stage of said devices forming branching sets, each set having first-polarity electrodes connected in common to one link of the second group and second-polarity electrodes connected to separate links of a third group;

each third-group link having a resistance-capacitance link marker connecting it to a third-group bias source;

the break down of a first-stage device and the charging of the associated second-stage link marker capacitance as defined in element (c) causing a second-stage device to break down to its low impedance state, thereby establishing a low-impedance test path including a first-group link and a second-group link to a third-group link, and bringing this entire path to the third-group bias potential, which prevents break down of other devices from the path; the means of element (c) being effective to cause the capacitance of the third-group link marker then to charge from said end-marking source to change the potential at all links of the path.

3. A communication switching network according to claim 2, further including means biasing all links of a busy path to substantially a reference potential intermediate said end-marking potential and said link-marking bias potentials, and differing from the end-marking potential by a value less than the breakdown value of any of said devices, to thereby prevent the break down of any device from said test path to any busy link.

4. A communication switching network according to claim 3, wherein the minimum and maximum breakdown values for all of said devices in the network differ by less than a given potential value and wherein the link marker bias potentials of successive stages differ from the end-marking potential by increasing values in increments greater than said given potential value to thereby insure that devices from said test path in the furthest stages break down in preference to devices in preceding stages.

5. A communication switching network according to claim 4, including a limit group of links in which the bias potential connected to said link markers thereof differs from said end-marking potnetial by a value less than the minimum breakdown value of said devices;

whereby in response to the marking of a link by connecting it to the end-marking source, the network is progressively tested for paths to idle links by switching only one device in each stage, from stage to stage, setting up a series path having one device per stage in the low impedance state, until the path is blocked by a busy or limit-stage link, the testing then reverting to a preceding link, proceeding along another path, and restoring to the high impedance state the devices of the previous path which are in stages beyond said preceding link.

6. A communication switching network according to claim 5, wherein said first-group links are individually connected to terminals of a first set and said limit-group links are individually connected to terminals of a second set;

a second source of end-marking potnetial which differs from the first said end-marking potential by a greater value than any of said interstage link marker bias potentials;

means for finding a path and establishing a connection between two given terminals, one of each set, by selectively connecting the first-group link associated with the first-set terminal to the first said end-marking source and the limit-group link associated with the second-set terminal to said second end-marking source; to thereby cause paths to be tested from the first-group link until the marked limit group link is reached, and means responsive thereto for making the path busy and biasing it to said reference potential.

7. A communication switching system comprising two networks as claimed in claim 6, interconnected by a group of junctors, with each junctor including a first-set terminal of each network.

8. A communication switching system according to claim 7, wherein a given second-set terminal of each network is selectively connected to its second end-marking source, further including scanning means for selecting the junctors in turn, with each junctor including means responsive to its selection for connecting the first said end-marking source to its associated first-group links of the two networks to thereby initiate the pathfinding test in each, and means responsive to the successful extension of a test path to the given terminal in both networks for signaling the scanning means to complete the establishment of the connection.

9. A communication switching system comprising two networks as claimed in claim 5, interconnected by a group of junctors, with each junctor including a second-set terminal of each network.

10. A communication switching system according to claim 9, wherein the end-marking source is selectively connected to a given first-set terminal of each network to thereby test the networks and mark the idle links accessible from the respective given terminals; scanning means for selecting the junctors in turn, with each junctor including means responsive to its selection for connecting a second end-marking potential source to its terminals of both networks, and means responsive to a marked test path extending to the junctor in both networks for signalling the scanning means to complete the establishment of the connection.

11. A communication switching network according to claim 5, wherein said stages form a first side of the network and further stages beyond the limit group form a second side;

wherein the said end-marking potential, the limit-stage marker potential, and the interstage link marker potentials of the second side of the network are of a first polarity with respect to said reference potential; and the interstage link marker potentials of the first side are of the second polarity;

a second end-marking source of potential of the second polarity;

said connection of the first said end-marking source being effective to charge the capacitors of the link markers of the links of the first side accessible from said first-group link to the first polarity, and to thereby cause all the devices of said first side to be restored to the high impedance state;

means then selectively connecting the second end-marking source to an end link of the second side to similarly test the paths of that side, and upon finding one of the marked paths of the first side to again break down the devices along that path and cause the connection to be completed.

12. A communication switching network according to claim 1, wherein said first- and second-group links are on a first side of the network, with the end-marking potential at a first polarity and the second-group marker bias potential at a second polarity with respect to a reference potential;

a similar arrangement on the second side of the network with a branching set of devices having their second-polarity electrodes connected to a last-group link and first-polarity electrodes connected to penultimate-group links, the penultimate links having resistance-capacitance markers to a bias source of first polarity;

at least one stage of said devices interconnecting the second-group and penultimate-group links;

means biasing busy links to substantially said reference potential;

the links of the first side accessible from said first-group link being marked to the first polarity responsive to said connection of the end-marking source, and the devices being restored to the high-impedance state;

means then selectively connecting a second end-marking source of second polarity to a last link to simillarly test the paths of the second side, and upon finding one of the marked paths of the first side to again break down the device of that path and cause the connection to be completed.

13. A communication switching network according to claim 12, wherein at least one side of the network includes stages having resistance-capacitance link markers of the a plurality of groups of interstage links between different same polarity.

14. A communication switching system comprising two networks as claimed in claim 12, interconnected by a group of junctors, with each junctor including a last-stage link of each network.

15. A communication switching system according to claim 14, wherein the first said end-marking source is selectively connected to a first-group link of each network to mark links on the first side of each;

scanning means for selecting the junctors in turn, with each junctor including means responsive to its selection for connecting the second end-marking source to its last-group link of each network, and means responsive to the completion of test paths through both networks for signalling the scanning means to complete the establishment of the connection.

16. A communication switching network comprising a plurality of interconnected bistable breakdown devices, having first and second opposed sets of terminals, with (a) a branching set of said devices having first-polarity electrodes connected in common to one terminal of the first set and second-polarity electrodes connected to separate links of a first group;

(b) a resistance-capacitance passive link marker individually connecting each first-group link to bias means, this being the only marking connection to these links;

(c) means connecting an end-marking potential source to said one terminal to cause one device of said branching set to break down to its low impedance state, and to thereby charge the capacitance of the associated link marker;

(d) said means of element (c) being further effective under given conditions subsequently to cause other devices of said set to break down.

17. A communication switching network according to claim 16, further including a second branching set of said devices having second polarity electrodes connected in common to one terminal of the second set and first-polarity electrodes connected to separate links of a second group;

a resistance-capacitance passive link marker individually connecting each second-group link to bias means, this being the only marking connection to these links;

means connecting a second end-marking potential source to said one terminal of the second set to break down a device of the second set, charge the capacitor of the associated link marker, and then break down another device of the set;

a plurality of center stage diodes, each having its first-polarity electrode connected to a first-group link and its second polarity electrode connected to a second-group link, a connection being completed via a center stage diode responsive to the charging of the capacitance of the link markers at both of its electrodes.

18. A communication switching network according to claim 17, including means biasing busy links to a potential which prevents the breakdown of devices thereto.

*19. An automatic switching system comprising a plurality of cascaded matrices, each of said matrices including first and second multiples arranged to provide intersecting crosspoints, means responsive to a simultaneous marking of the ends of a desired path at a multiple in one of said matrices and a multiple in another of said matrices for initiating a systematic search sequentially and individually over a plurality of self-seeking paths extended via randomly selected crosspoints in said cascaded matrices, and means responsive to the completion of a first of said paths between said marked multiples for terminating said systematic search over said paths.*

*20. An electronic switching telephone system comprising means for initiating a systematic search sequentially and individually over a plurality of self-seeking paths through randomly selected crosspoints in a multi-stage switching network responsive to an application of a potential difference across the ends of said paths, means responsive to an absence of current flow over an incompleted path for releasing each of said randomly selected crosspoints in each path which is not completed through said network, and means responsive to current flow over a completed one of said paths for holding said one path.*

References Cited

The following references, cited by the Examiner, are of record in the patented file of this patent or the original patent.

UNITED STATES PATENTS

| | | | |
|---|---|---|---|
| 2,946,855 | 7/1960 | Hussey | 179—18 |
| 2,951,124 | 8/1960 | Hussey et al. | 179—18 |
| 2,987,579 | 6/1961 | Dunlap | 179—18 |
| 3,027,427 | 3/1962 | Woodin | 179—18 |

WILLIAM C. COOPER, *Primary Examiner.*